No. 771,418. Patented October 4, 1904.

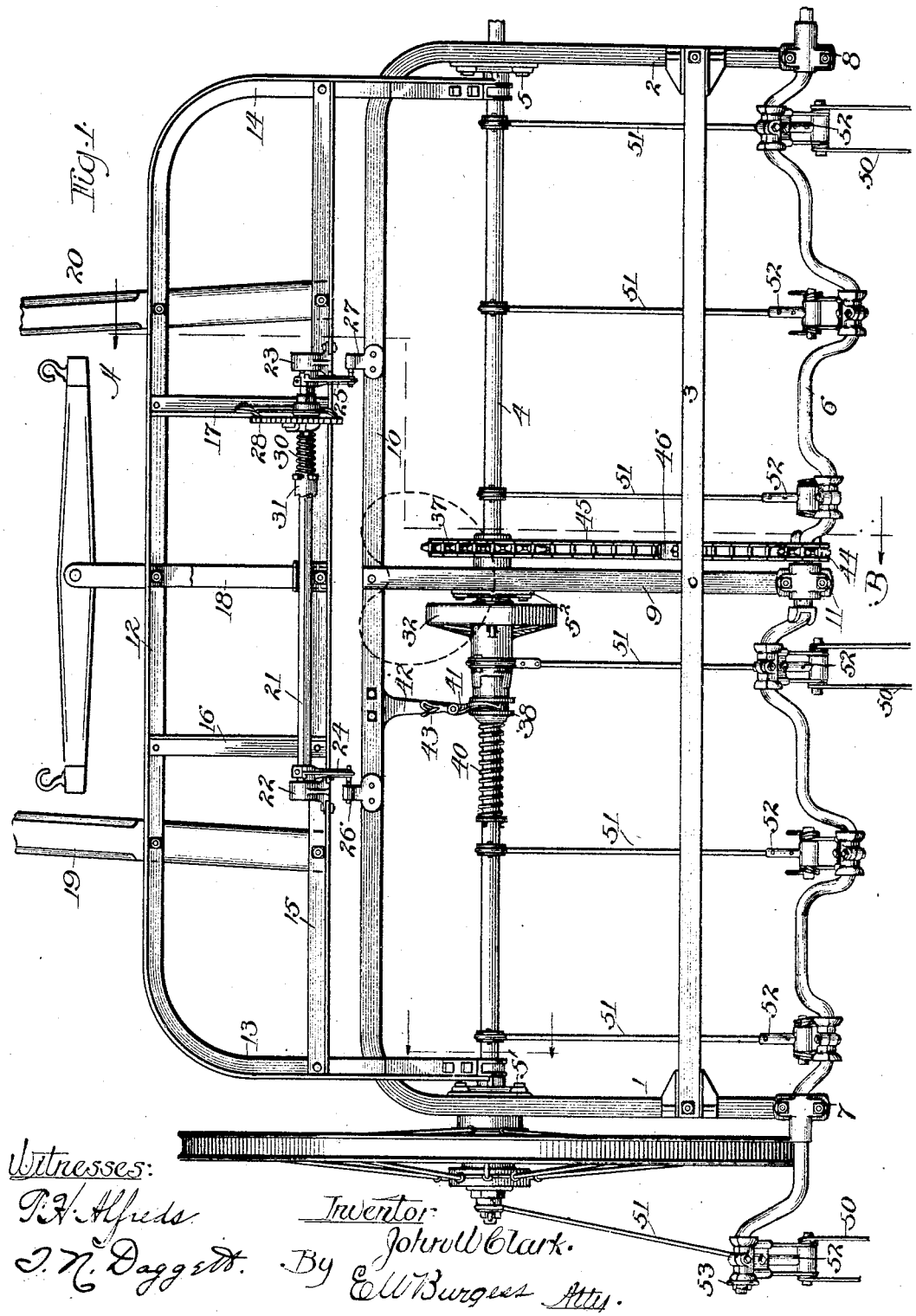

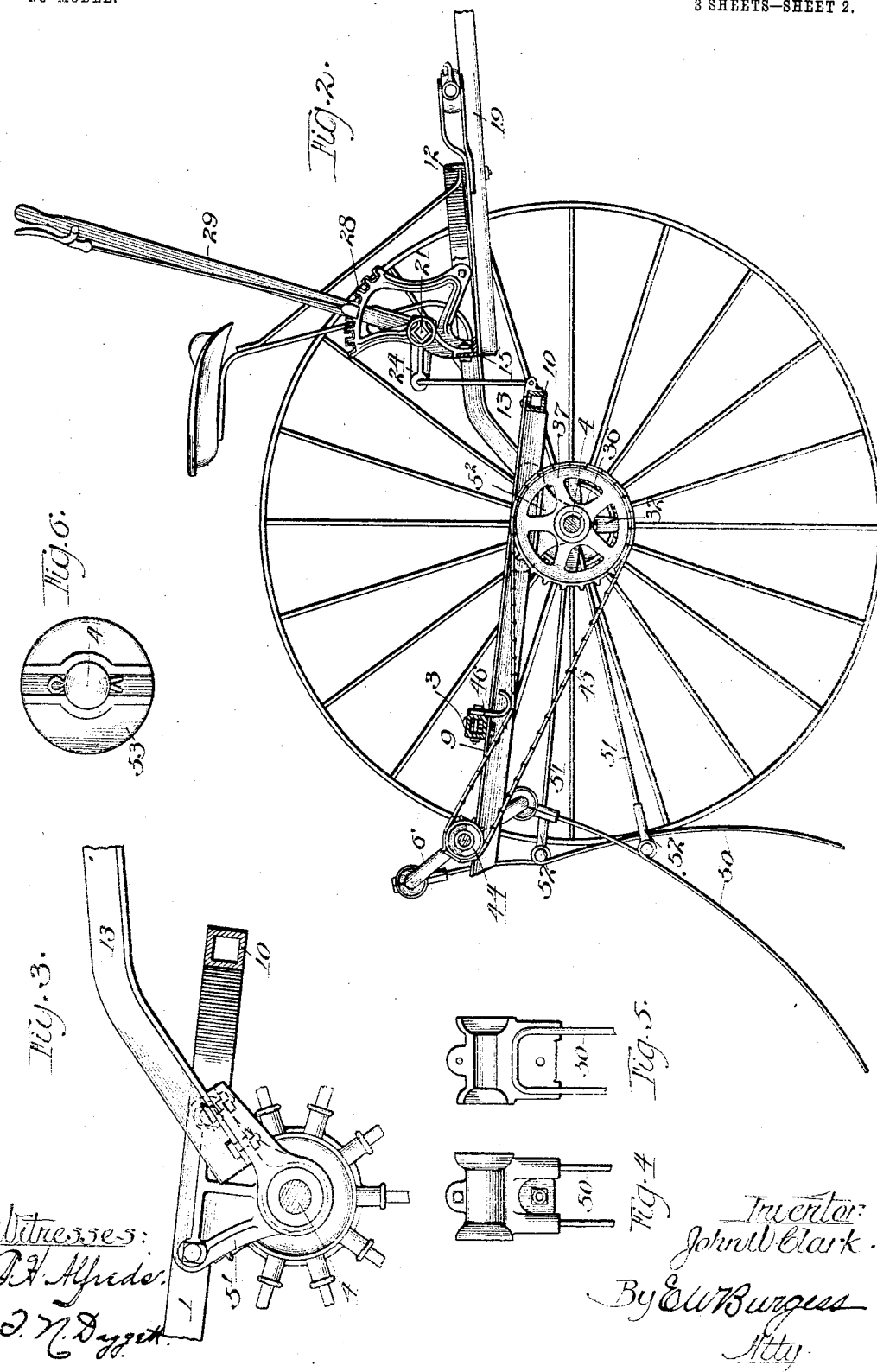

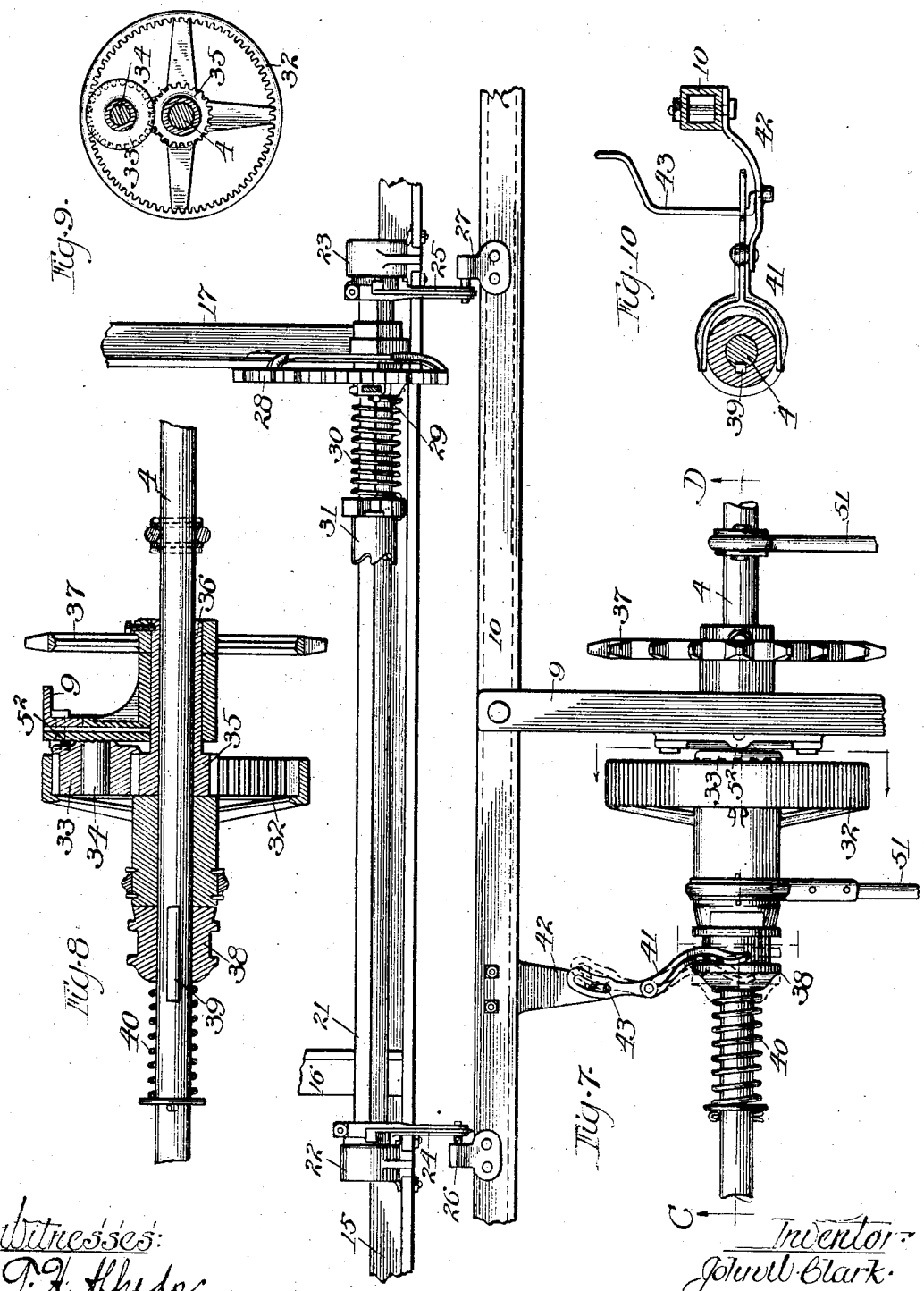

UNITED STATES PATENT OFFICE.

JOHN W. CLARK, OF SPRINGFIELD, OHIO, ASSIGNOR TO INTERNATIONAL HARVESTER COMPANY, OF CHICAGO, ILLINOIS, A CORPORATION OF NEW JERSEY.

HAY-TEDDER.

SPECIFICATION forming part of Letters Patent No. 771,418, dated October 4, 1904.

Application filed March 21, 1904. Serial No. 199,284. (No model.)

*To all whom it may concern:*

Be it known that I, JOHN W. CLARK, a citizen of the United States, residing at Springfield, in the county of Clark and State of Ohio, have invented certain new and useful Improvements in Hay-Tedders, of which the following is a specification, reference being had to the accompanying drawings, forming a part thereof.

My invention relates to hay-tedders in which a multiple crank-shaft is supported in bearings on a wheel-frame, tedder-forks journaled on the crank-shaft with vibrating links pivoted thereto and connecting them with a separate part of the machine in a manner to control the operative path thereof, in which the driving-axle, having the road-wheels journaled thereon and provided with the usual driving and backing ratchet-and-pawl mechanism, is journaled on said wheel-frame and in which a draft-frame is hinged to the axle and provided with means for controlling the movement of the two frames relative to each other.

The objects of my invention are to provide wheel and draft frames that shall be simple and strong, composed of few parts, and well adapted to receive and support the operative parts; to provide an improved mechanism for imparting the motion of the driving-axle to the multiple crank-shaft; to provide an improved form of fork, and generally to so construct and organize the various parts as to produce a complete machine that will be compact and strong, light, and easily operated.

The invention consists primarily of a novel gear connection between the driving-axle and the multiple crank-shaft and an improved frame construction, all of which will be more particularly described and pointed out in the following specification, in which—

Figure 1 is a plan view. Fig. 2 is a partial end view of Fig. 1 on line A B. Fig. 3 is a detached detail of the axle and draft connections with their respective frames. Figs. 4 and 5 are details of the journal-bearings of the forks. Fig. 6 is a detail of the securing-washer at the ends of the multiple crank-shaft. Fig. 7 is a plan view of part of the driving-gear. Fig. 8 is a section on line C D of Fig. 7. Fig. 9 is a detail of part of the driving-gear, and Fig. 10 is a detached elevation of the gear-shipping mechanism.

Like reference-numerals designate the same parts throughout the various figures.

The wheel-frame comprises a continuous U-shaped member having the rearwardly-extending arms 1 and 2, that are connected by the cross-bar 3, these parts being preferably made of square tubing. The driving-axle 4 is journaled in bearings formed in depending brackets or hangers 5 and 5', secured near the forward parts of the arms 1 and 2, and the multiple crank-shaft 6 is journaled in bearings 7 and 8 on the rearwardly-extended ends of the arms 1 and 2. A centrally-located frame member 9 is secured at one end to the forward side 10 of the wheel-frame and extends rearward beneath the bar 3 and has a supplemental journal-bearing 11 for the multiple crank-shaft secured to its rear end. A depending bracket $5^2$ forms a supplemental support for the driving-axle in a manner that will be more particularly described later, the bracket being secured to the frame member 9, as shown in Figs. 7 and 8. The draft-frame is substantially U shape in form, having the front member 12 and the rearwardly-extending arms 13 and 14, that are connected intermediate their length by the cross-bar 15, said arms being bent downward in rear of the cross-bar and having journal-bearings adapted to receive the inner ends of the axle-journals, as shown in detail in Fig. 3. Supplemental bars 16 and 17 are secured to the bars 12 and 15, and a central draft-bar 18, having a swingletree connected to its forward end, is also secured thereto. The seat is supported on springs secured at their lower ends to the two members 12 and 15, and the thills 19 and 20 are also secured thereto. The draft-wheels are journaled on the axle and have the usual pawl-and-ratchet connections therewith common to this class of machines.

A rock-shaft 21, mounted in suitable bearings 22 and 23, secured to the draft-frame bar 15, is provided at its ends with rearwardly-extending arms 24 and 25, that are connected by pivotal links with ears 26 and 27, secured to the wheel-frame member 10.

Mounted on the draft-frame is a sector-rack 28 and a hand-lever 29, having the usual sliding detent and thumb-latch mechanism engaging therewith. The hand-lever is yieldingly journaled relatively to the rock-shaft, and a spiral spring 30, operating between the lever and the adjustable sleeve 31 on the rock-shaft, yieldingly holds the operating-forks in contact with the ground, and the hand-lever 29 may be manipulated to rock the wheel-frame about its axis. The adjusting-sleeve 31 has a clutch connection with the rock-shaft and is operated to adjust the tension of the spring 30.

The gear connection between the driving-axle 4 and the multiple crank-shaft 6 comprises the following parts: An internal gear-wheel 32 is loosely journaled on the axle 4 and meshes with a pinion 33, journaled on a stud 34, forming a part of the depending bracket 5². The pinion meshes with a pinion 35, also journaled loosely on the axle and having an extended sleeve portion 36, having its bearing in the bracket 5². The sleeve projects beyond the bearings and a sprocket-wheel 37 is secured thereto. The teeth of the pinion 33 are shrouded on the surface adjacent the bracket 5² in a manner to prevent endwise movement of the pinion 35 in one direction, and the sprocket-wheel 37 secures it against movement in the opposite direction. A clutch member 38, driven by a spline 39 on the axle 4, is provided with clutch-teeth that are adapted to engage with similar teeth on the extended hub of the gear-wheel 32, the two parts being held in engagement by means of the spiral spring 40, surrounding the axle and operating between a fixed part secured to the axle and the end of the clutch member 38.

A forked lever 41, pivoted on an arm 42, secured to the bar 10, and operated by a crank 43, straddles the clutch member 38 between the collars and operates in a well-known manner to move the sliding member out of engagement with the wheel-hub. A sprocket-wheel 44, made in two parts and adapted to receive the multiple crank-shaft between them in a well-known way, has a journal portion and forked ends integral therewith, the forked ends being adapted to engage with the oppositely-disposed crank-arms of the multiple crank-shaft in a well-known manner and the journal having its bearings in the part 11. The sprocket-chain 45 connects the two sprocket-wheels, and 46 is an adjustable chain-tightener secured to the arm 9.

The forks 50 are double-tined and their upper ends are clamped between the two parts of journal-bearings surrounding the various crank-arms, as shown in Figs. 4 and 5. The forks are sustained intermediate their lengths by radius-links 51, that are pivoted about the axle at their forward ends and are provided with the socketed T-shaped members 52 at their rearward ends. The opposite ends of the head portion of the T are reduced in size, and the tines of the forks are coiled about them in a manner to form a vibratable connection therewith. The journal-bearings of the outside forks are held in place by means of the special washer 53. (Shown in detail in Fig. 6.)

The manner of arranging the driving-gear is the important feature of my invention, as it obviates the necessity of an intermediate counter-shaft between the driving-axle and crank-shaft.

What I claim as my invention, and desire to secure by Letters Patent, is—

1. In a hay-tedder the combination of the traction-wheels, the axle driven thereby, the wheel-frame and a multiple crank-shaft mounted on its rear end, a gear connection between the axle and crank-shaft comprising an internal gear-wheel mounted to rotate about the axle and means for clutching it therewith, a pinion journaled on the axle and supported in a bracket secured to the wheel-frame, a sprocket-wheel secured to the pinion, a pinion journaled on a fixed part of the frame and meshing with the first-mentioned pinion and the internal gear-wheel, a sprocket-wheel on the crank-shaft and a chain connection between the two sprocket-wheels.

2. In a hay-tedder the combination of the traction-wheels, the axle driven thereby, the wheel-frame, a multiple crank-shaft mounted thereon, a gear connection between the axle and crank-shaft comprising an internal gear-wheel journaled on the axle and means for clutching it therewith, a pinion journaled on the axle, a sprocket-wheel forming part of said pinion, an intermediate pinion journaled on a fixed part of the frame, and meshing with said internal gear-wheel and first-mentioned pinion, a sprocket-wheel on the crank-shaft and a chain connection between the two sprocket-wheels.

3. In a hay-tedder the combination of the traction-wheels, the axle driven thereby, a wheel-frame, a multiple crank-shaft mounted thereon, a gear connection between the axle and said crank-shaft comprising an internal gear-wheel journaled on the axle and means for clutching it therewith, a pinion mounted to rotate about the axle, a sprocket-wheel secured to said pinion, an intermediate pinion journaled on a fixed part of the frame and meshing with said internal gear-wheel and first-mentioned pinion, a sprocket-wheel on the crank-shaft and a chain connection between the two sprocket-wheels.

4. In a hay-tedder the combination of the traction-wheels, the axle driven thereby, a wheel-frame, a multiple crank-shaft mounted thereon, a gear connection between the axle and said crank-shaft comprising an internal gear-wheel journaled on the axle and means for clutching it therewith, a pinion journaled on the axle and having a sleeve portion, a bracket secured to the wheel-frame and forming a bearing for said sleeve, a sprocket-wheel secured to the sleeve, an intermediate pinion journaled on a stud, forming part of said bracket and meshing with said internal gear-wheel and said first-mentioned pinion, a sprocket-wheel secured to the crank-shaft and a chain connection between the two sprocket-wheels.

5. In a hay-tedder the combination of the traction-wheels, the axle driven thereby, a wheel-frame, a multiple crank-shaft mounted thereon, a gear connection between the axle and said crank-shaft comprising an internal gear-wheel journaled on the axle and means for clutching it therewith, a pinion journaled on the axle and having a sleeve portion, a bracket secured to the wheel-frame and forming a bearing for said sleeve, a sprocket-wheel secured to the sleeve outside the bearings, an intermediate pinion journaled on a stud forming part of said bracket and meshing with said first-mentioned pinion and said internal gear-wheel, said intermediate pinion having the ends of its teeth shrouded in a manner to prevent endwise movement of the two outside gears, a sprocket-wheel secured to the crank-shaft, and a chain connection between the two sprocket-wheels.

6. In a hay-tedder the combination of a wheel-frame, a draft-frame, an axle, a multiple crank-shaft, said wheel-frame comprising a continuous U-shaped member having rearwardly-extending arms upon which is mounted the crank-shaft, a cross-bar joining the arms, depending hangers secured near the forward ends of said arms and in which the axle is journaled and having the draft-frame pivotally connected with the depending hangers.

7. In a hay-tedder the combination of a wheel-frame, a draft-frame, an axle, a multiple crank-shaft, said wheel-frame and said draft-frame comprising continuous U-shaped members having rearwardly-extending arms, cross-bars connecting each pair of rearwardly-extending arms, depending hangers secured near the forward ends of the arms of the wheel-frame and forming journal-bearings for the axle, and having the rearwardly-extending arms of the draft-frame journaled on said bearings for the axle.

8. In a hay-tedder the combination of the traction-wheels, an axle, a wheel-frame adapted to rock relative to the axle, a multiple crank-shaft journaled on the wheel-frame and means connected with the traction-wheels for rotating it, double-tined tedder-forks journaled at their upper ends on the crank-shaft, vibrating links pivotally connected at one end with the axle and provided at their opposite ends with T-shaped members having their shanks secured to the vibrating links and the tines of the forks coiled about the opposite ends of their heads and adapted to vibrate thereon.

9. In a hay-tedder the combination of an axle, a multiple crank-shaft, double-tined tedder-forks having substantially U-shaped heads, half-boxes that secure said heads between them and are journaled on the crank-shaft, the said forks having their tines coiled intermediate their ends and supported by links having pivotal connection with the said axle.

10. In a hay-tedder the combination of an axle, a multiple crank-shaft, double-tined tedder-forks having substantially U-shaped heads, half-boxes that secure said heads between them and are journaled on the crank-shaft, the said tines being supported intermediate their ends by links having pivotal connection with the axle.

In witness whereof I hereto affix my signature in presence of two witnesses.

JOHN W. CLARK.

Witnesses:
 WM. H. GUTHRIE, Jr.,
 H. B. SPERRY.